(12) United States Patent
White

(10) Patent No.: US 12,491,387 B2
(45) Date of Patent: *Dec. 9, 2025

(54) EMERGENCY ESCAPE SLIDE INCORPORATED INTO EXIT

(71) Applicant: Altevac, LLC, Boca Raton, FL (US)

(72) Inventor: Blair White, Huntersville, NC (US)

(73) Assignee: Altevac, LLC, Boca Raton, FL (US)

( * ) Notice: Subject to any disclaimer, the term of this patent is extended or adjusted under 35 U.S.C. 154(b) by 229 days.

This patent is subject to a terminal disclaimer.

(21) Appl. No.: 18/106,686

(22) Filed: Feb. 7, 2023

(65) Prior Publication Data

US 2023/0191164 A1    Jun. 22, 2023

Related U.S. Application Data

(63) Continuation of application No. 16/173,666, filed on Oct. 29, 2018, now Pat. No. 11,596,814, which is a continuation of application No. 14/940,763, filed on Nov. 13, 2015, now Pat. No. 10,112,063.

(51) Int. Cl.
*A62B 1/20* (2006.01)
*G08B 25/12* (2006.01)

(52) U.S. Cl.
CPC ................ *A62B 1/20* (2013.01); *G08B 25/12* (2013.01)

(58) Field of Classification Search
CPC .. A62B 1/20; A62B 3/00; B64D 25/14; G08B 25/12; Y10S 244/905
See application file for complete search history.

(56) References Cited

U.S. PATENT DOCUMENTS

| | | | | |
|---|---|---|---|---|
| 2,765,131 A | * | 10/1956 | Boyle | B64D 25/14 193/25 B |
| 3,397,432 A | | 8/1968 | Banas | |
| 3,463,287 A | * | 8/1969 | Smith | B64D 25/14 193/25 B |
| 3,465,991 A | * | 9/1969 | Banas | B64D 25/14 193/25 B |
| 3,621,383 A | * | 11/1971 | Rush | B64D 25/14 193/25 B |
| 3,712,417 A | * | 1/1973 | Chacko | B64D 25/14 193/25 B |
| 3,771,749 A | * | 11/1973 | Smialowicz | B64D 25/14 244/905 |

(Continued)

FOREIGN PATENT DOCUMENTS

EP          0743246 A1    11/1996

*Primary Examiner* — Colleen M Chavchavadze
*Assistant Examiner* — Shiref M Mekhaeil
(74) *Attorney, Agent, or Firm* — Caesar Rivise, PC

(57) ABSTRACT

An emergency escape mechanism is disclosed. A deployable and inflatable slide is located proximate the exit door of a building. When the alarm switch on the alarm box next to the door is set to unlock the door may be opened and a chute or slide falls out to the exterior of the building. A mercury switch or the like is activated as the uninflated slide tilts out which activates an inflation means, preferably a compressed gas cylinder or the like. The slide or chute is anchored to the building by a girt bar anchored in the floor and a plurality of chute support straps. This allows for rapid evacuation of the building. Additionally, the alarm box switch may operate a silent alarm to alert the police of a potentially hazardous situation.

7 Claims, 11 Drawing Sheets

(56) References Cited

U.S. PATENT DOCUMENTS

| | | | | |
|---|---|---|---|---|
| 3,840,057 A * | 10/1974 | Lesh, Jr. | ................ | B64D 25/14 193/25 B |
| 3,845,920 A * | 11/1974 | Satterfield | ............. | B64D 25/14 193/25 B |
| 3,860,984 A * | 1/1975 | Fisher | ...................... | A62B 1/20 193/25 B |
| 3,910,532 A * | 10/1975 | Fischer | ................. | B64D 25/14 244/905 |
| 4,013,247 A * | 3/1977 | Giffin | ..................... | B64D 25/14 193/25 B |
| 4,031,583 A | 6/1977 | Phillips, II | | |
| 4,125,235 A | 11/1978 | Fitzgerald et al. | | |
| 4,162,717 A | 7/1979 | Oril et al. | | |
| 4,184,057 A * | 1/1980 | Kumita | ................. | H01H 35/14 200/61.45 R |
| 4,245,213 A * | 1/1981 | Kriger | ...................... | G07C 9/21 235/382 |
| 4,324,425 A | 4/1982 | Logan | | |
| 4,720,065 A | 1/1988 | Hamatani | | |
| 4,930,823 A | 6/1990 | Rivera | | |
| 5,060,753 A | 10/1991 | Hopkins | | |
| 5,106,036 A | 4/1992 | Sepstrup | | |
| 5,400,985 A | 3/1995 | Banks | | |
| 5,586,615 A * | 12/1996 | Hammer | .................. | A62B 1/20 182/48 |
| 5,738,303 A | 4/1998 | Hamatani et al. | | |
| 5,738,305 A * | 4/1998 | Pruitt | ...................... | A62B 1/20 193/25 B |
| 5,833,006 A | 11/1998 | McCabe et al. | | |
| 5,906,340 A * | 5/1999 | Duggal | ................. | B64D 25/14 193/25 B |
| 5,908,082 A | 6/1999 | Turner et al. | | |
| 5,988,438 A * | 11/1999 | Lewis | ...................... | B63C 9/18 441/98 |
| 6,082,491 A * | 7/2000 | Collier | ..................... | A62B 1/20 244/905 |
| 6,536,715 B1 | 3/2003 | Moran et al. | | |
| 6,633,239 B2 | 10/2003 | Plude et al. | | |
| 6,644,596 B1 * | 11/2003 | Jurlina | ................. | B64D 25/14 244/905 |
| 6,676,082 B2 * | 1/2004 | Alberts | ................. | B64D 25/14 244/905 |
| 6,814,183 B2 | 11/2004 | Horvath et al. | | |
| 6,877,698 B2 | 4/2005 | Baker et al. | | |
| 7,018,079 B1 * | 3/2006 | Franco-Vila | ............. | A62B 1/20 362/311.03 |
| 7,191,869 B1 | 3/2007 | Denison | | |
| 7,380,755 B2 * | 6/2008 | Matsch | ................. | B64D 25/14 244/905 |
| 7,434,600 B1 * | 10/2008 | Swierkocki | ............. | B64C 25/52 141/54 |
| 7,644,739 B1 * | 1/2010 | Vezzosi | ................. | B64C 25/56 141/54 |
| 8,215,586 B2 | 7/2012 | O'Donnell et al. | | |
| 8,760,304 B2 | 6/2014 | Pincu | | |
| 9,564,041 B1 | 2/2017 | Dedeaux | | |
| 10,112,063 B1 * | 10/2018 | White | .................... | G08B 25/12 |
| 10,807,736 B2 * | 10/2020 | Palaniappan | .......... | B64D 47/04 |
| 11,596,814 B2 | 3/2023 | White | | |
| 2003/0080254 A1 * | 5/2003 | Alberts | ................. | A62B 1/20 244/137.2 |
| 2003/0206104 A1 | 11/2003 | Lowry et al. | | |
| 2004/0094361 A1 | 5/2004 | Gronlund et al. | | |
| 2004/0094671 A1 | 5/2004 | Moro et al. | | |
| 2008/0223656 A1 | 9/2008 | John | | |
| 2011/0139934 A1 | 6/2011 | Giesa et al. | | |
| 2011/0226550 A1 | 9/2011 | Tran | | |
| 2011/0278092 A1 * | 11/2011 | Brown | ..................... | A62B 1/20 182/48 |
| 2013/0075524 A1 * | 3/2013 | Islam | ..................... | B64D 25/00 244/118.5 |
| 2013/0213737 A1 | 8/2013 | Bambrick et al. | | |
| 2013/0228395 A1 | 9/2013 | Bell | | |
| 2014/0291070 A1 * | 10/2014 | White | ..................... | A62B 1/20 182/48 |
| 2014/0366341 A1 | 12/2014 | Rivault et al. | | |
| 2015/0034769 A1 | 2/2015 | Minchau et al. | | |
| 2015/0097083 A1 * | 4/2015 | Fellmann | ................ | B64D 9/00 244/137.2 |
| 2019/0010962 A1 * | 1/2019 | White | .................... | B64D 25/14 |
| 2019/0060681 A1 | 2/2019 | White | | |
| 2019/0150248 A1 * | 5/2019 | Leegate | ................. | B64D 47/02 307/9.1 |
| 2020/0206541 A1 * | 7/2020 | Spasiano | ................ | A62B 1/20 |

\* cited by examiner

EMERGENCY ESCAPE SLIDE INCORPORATED INTO EXIT

CROSS REFERENCE TO RELATED APPLICATIONS

This application is a continuation of application Ser. No. 16/173,666, filed on Oct. 29, 2018, entitled Emergency Escape Slide Incorporated Into Exit, which in turn is a continuation of application Ser. No. 14/940,763, filed on Nov. 13, 2015, entitled Emergency Escape Slide Incorporated Into Exit, now U.S. Pat. No. 10,112,063, issued on Oct. 30, 2018, which applications are assigned to the same assignee as the subject invention and whose disclosures are specifically incorporated by reference herein.

BACKGROUND OF THE INVENTION

Field of the Invention

The present invention relates generally to escape mechanisms and, more specifically, to an escape mechanism that is incorporated into an exterior door of a building. Even more specifically, it relates to a door that includes a safety switch to prevent inadvertent opening of the door and activation of the slide and to additionally provide a silent (or otherwise) alarm, a compressed gas container to inflate the slide, and the slide itself, located proximate the body of the door and designed to be released and inflated to provide a rapid egress from the building in case of fire or another emergency.

Description of the Prior Art

There are other escape mechanisms which provide for rapid egress from a building. While these mechanisms may be suitable for the purposes for which they were designed, they would not be as suitable for the purposes of the present invention as heretofore described. It is thus desirable to provide an emergency escape mechanism that is integral with an exit door of a building. It is further desirable to have that mechanism easily and quickly activated and to provide an alarm notifying authorities that the door and the emergency exit are being used.

SUMMARY OF THE PRESENT INVENTION

A primary object of the present invention is to provide an emergency escape mechanism that is fitted proximate an exit door.

Another object of the present invention is to provide an emergency escape mechanism where the exit door includes an inflatable ramp or slide that extends outwardly to allow the users to rapidly leave a building.

Yet another object of the present invention is to provide an emergency exit mechanism located proximate an exit door where the ramp or exit slide is inflated by a canister of compressed gas.

Still yet another object of the present invention is to provide an emergency exit mechanism where the exit additionally includes a switch to allow the opening of the door and the activation of the slide or chute.

Another object of the present invention is to provide an emergency exit mechanism where the activation switch is integral to the alarm system in the building.

Still yet another object of the present invention is to provide an emergency exit mechanism where the chute or slide is deployed after both the alarm/activation switch has been engaged and when the exit door has been opened.

Additional objects of the present invention will appear as the description proceeds.

The present invention overcomes the shortcomings of the prior art by providing an emergency escape mechanism that is integral with the exit door of various rooms in the building and that provides a quick egress to ground level from rooms on the second floor and above.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures.

10 emergency evacuation system
12 alarm box
14 emergency slide or chute
16 exit door
18 alarm switch
20 interior door handle
22 chute/slide support straps
24 girt bar
26 locking/unlocking rod
28 mercury switch
30 silent alarm
32 locking nubs
34 compressed gas cylinder
36 locking bar aperture
38 compressed gas activation line
40 floor
42 interior door handle
44 door interior side
46 door exterior side
V intruder
C children
R classroom
T teacher
W wall
B building
A1 door opening directional arrow
A2 slide/chute deployment directional arrow

BRIEF DESCRIPTION OF THE DRAWING FIGURES

In order that the invention may be more fully understood, it will now be described, by way of example, with reference to the accompanying drawing in which:

FIG. 1 an illustrative view of the prior art showing a situation that the present invention is designed to alleviate.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
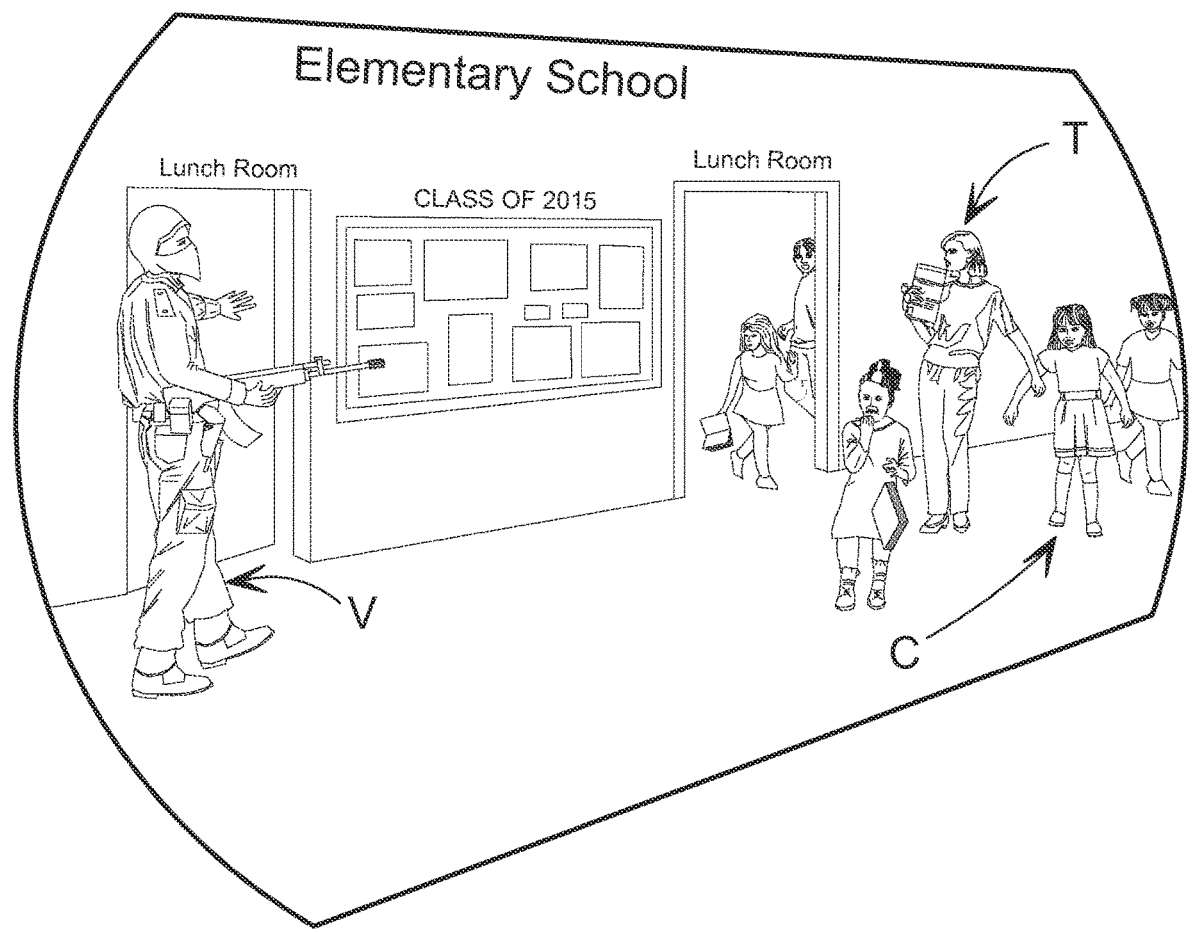

FIG. 1 is an illustration of prior art in that schools or public buildings may be threatened by violent individuals entering thereinto and either taking hostages, targeting individuals, or randomly injuring groups of people. In the situation represented in the Figure, the violent individual indicated at V is threatening the children C present in the school, while the teacher T (or other authority) is trying to get the children (or other occupants of the public building) out of the building and to safety.

Figure 2:
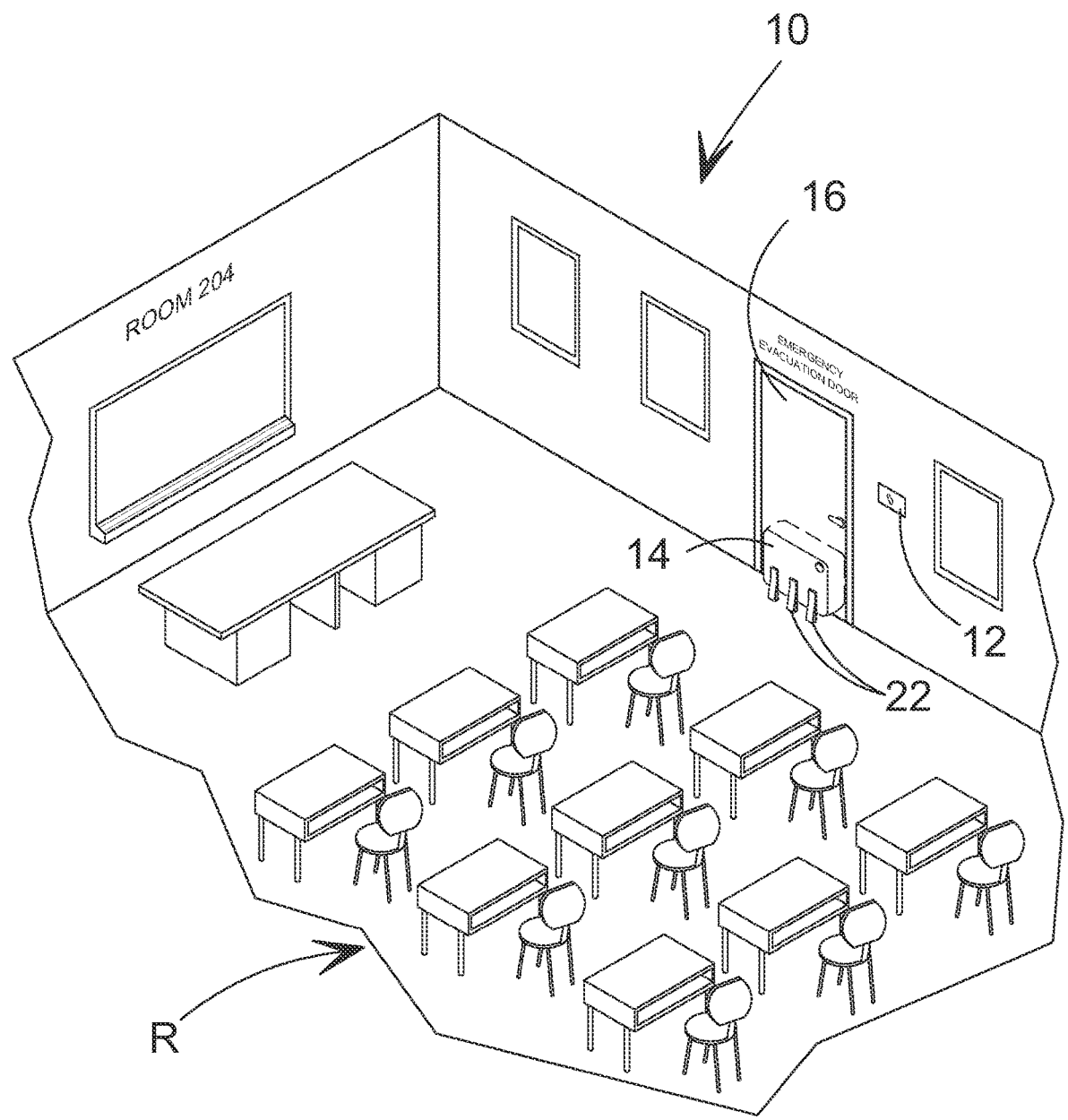
FIG. 2 is an illustrative view of the present invention as it is meant to be used.

FIG. 2 shows the present invention indicated generally at 10 with the door 16, the slide or chute 14 attached to the door 16, and the alarm box 12 (which will be discussed further below). All of these, in the embodiment illustrated herein, are located in a classroom indicated at R.

Figure 3:
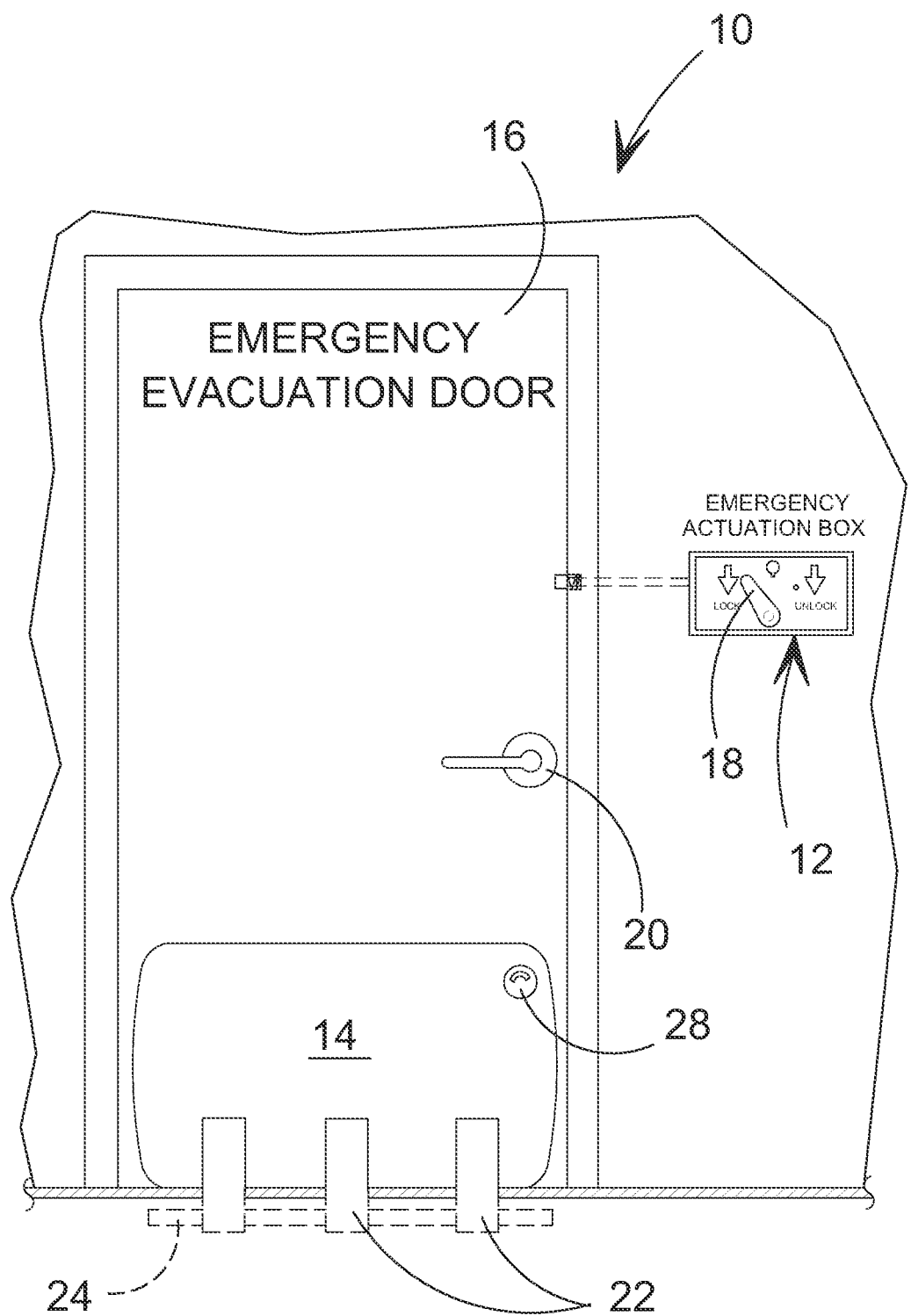
FIG. 3 is a front view of the present invention attached to an emergency evacuation exit.

In FIG. 3 a front view of the present invention is seen. Attached to the door 16 is the slide or chute 14 with the chute support straps 22 and the attendant girt bar indicated at 24. Also located on or proximate the slide 14 is a mercury switch, or the like 28 discussed further below. Also seen in the Figure is the alarm switch 18.

Figure 4:
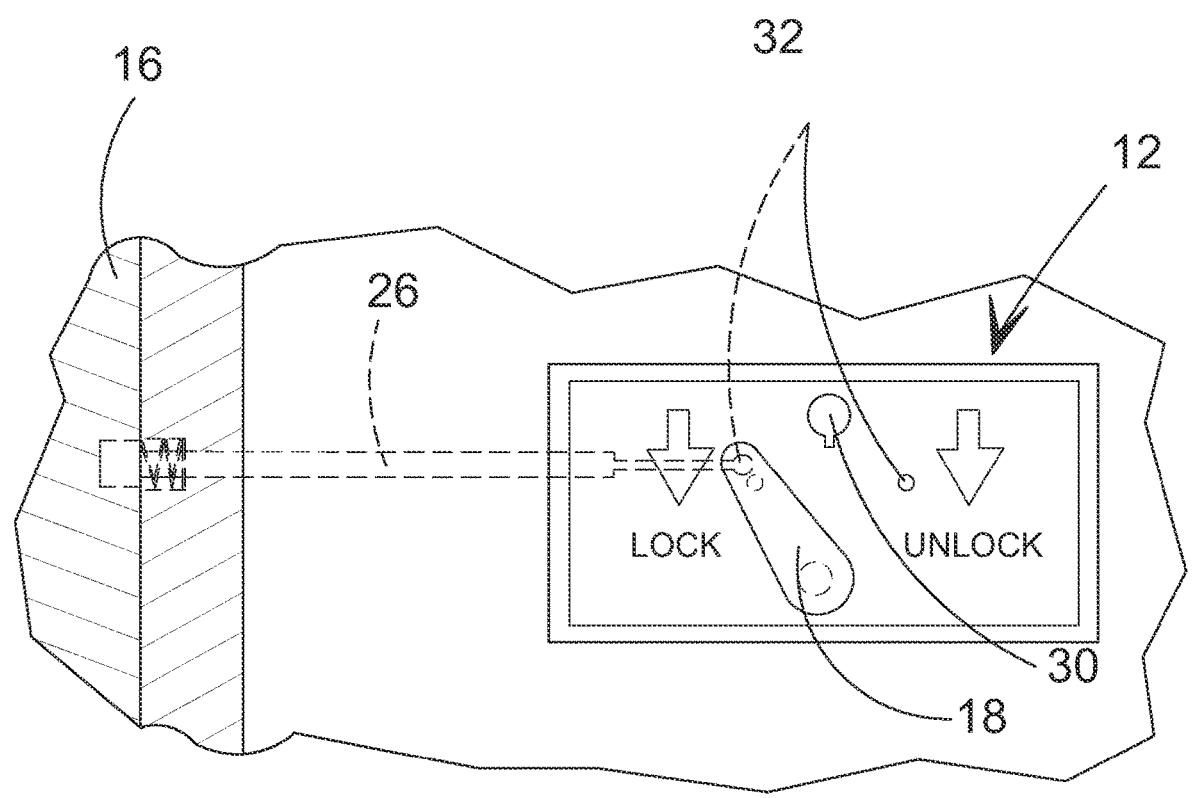
FIG. 4 is a detailed view of the locking portion of the present invention.

Turning to FIG. 4 a detailed view of the present invention with the door 16 in a locked configuration as can be seen by the position of the alarm switch 18 on the alarm box 12. The switch 18 travels between the two locking nubs 32 and controls the locking/unlocking rod as indicated at 26. Also seen in the Figure is the silent alarm activator 30 which is tripped when the switch 18 is moved to the unlocked position.

Figure 5:
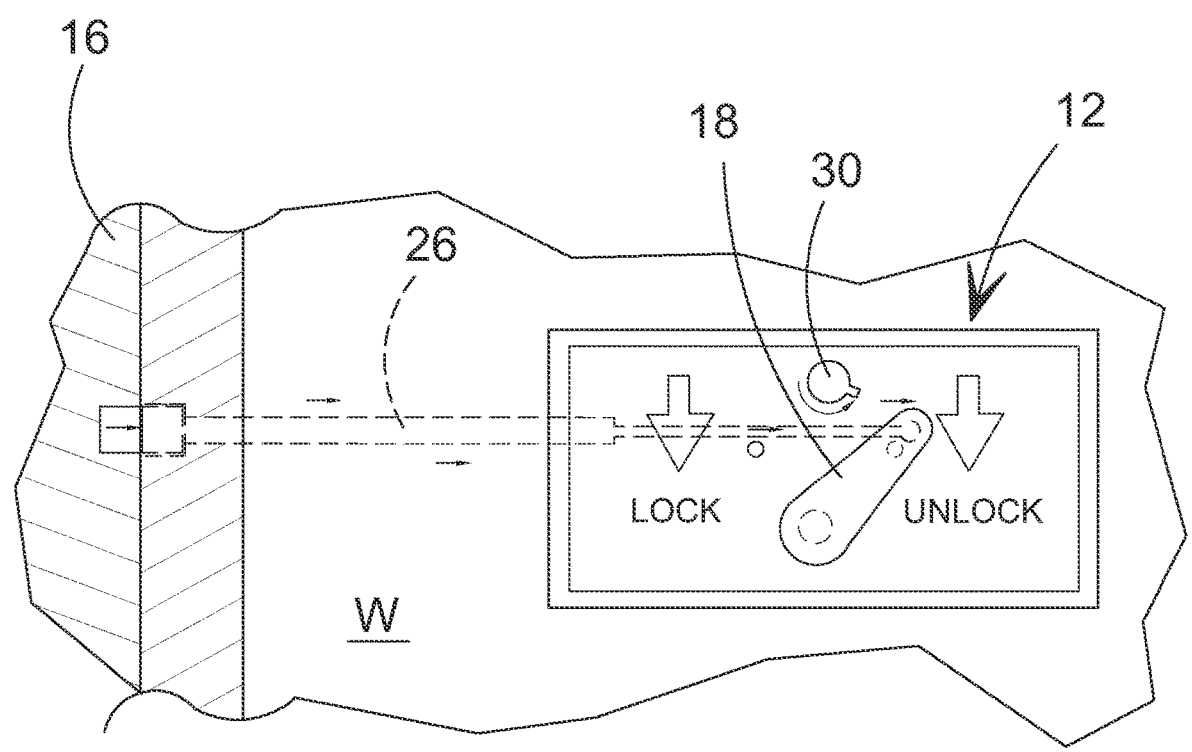
FIG. 5 is another detailed view of the locking portion of the present invention.

In FIG. 5 there is seen a detailed view of the present invention in the unlocked position. As in FIG. 4, there is the door 16, the locking/unlocking bar 26, the alarm box 12, and the alarm switch 18, this time engaging the locking nub 32 that pulls the unlocking bar 26 from the mechanism on the door 16. As can be seen in the Figure, this also activates the silent alarm indicated at 30.

Figure 6:
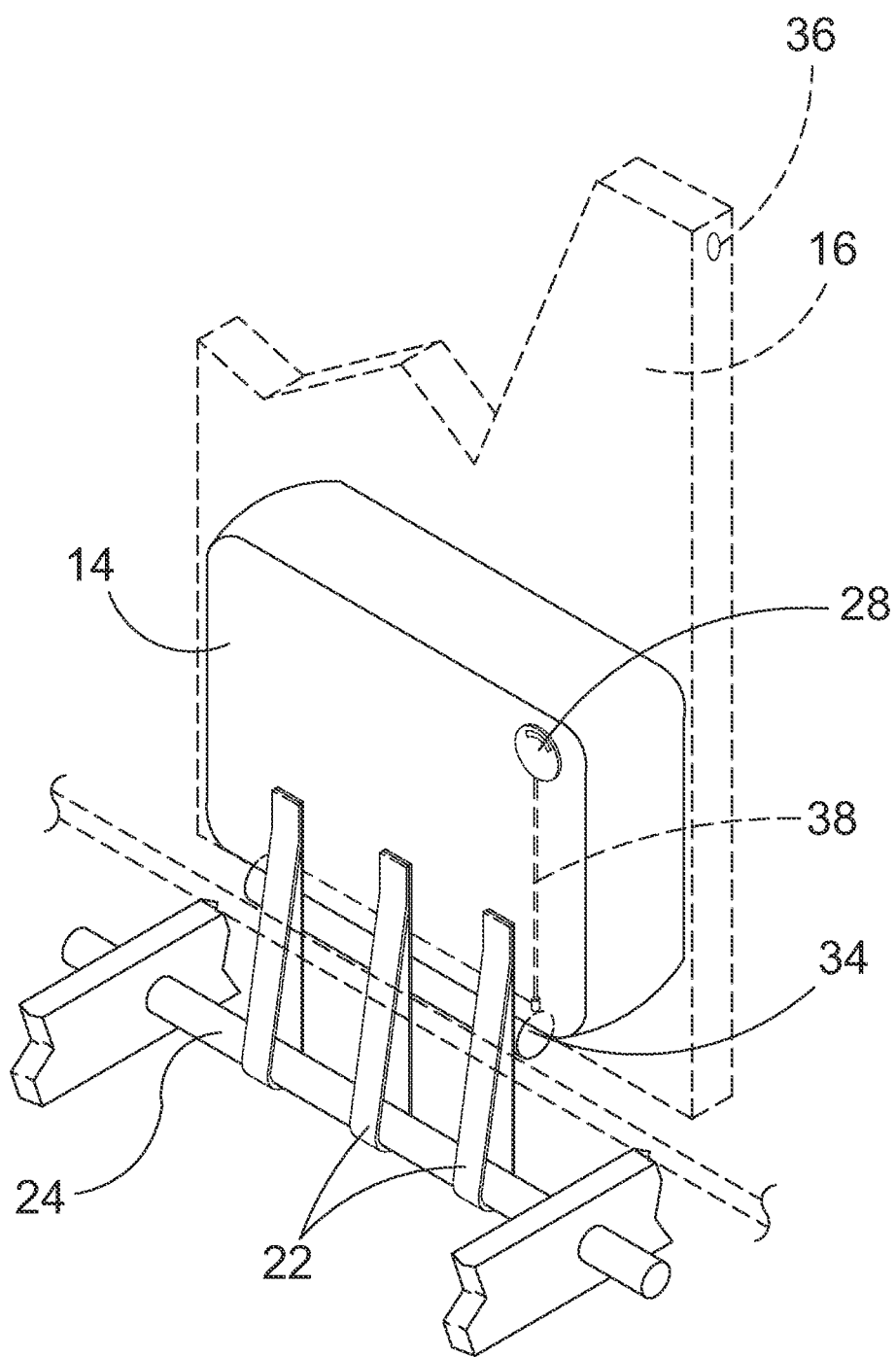
FIG. 6 is a detailed view of the door portion of the present invention with the emergency slide or chute seen in the stowed position.

FIG. 6 shows a detailed view of the door 16 and various components of the present invention. In addition to the door 16 are the chute or slide 14, the chute straps 22, the girt bar 24, the mercury switch 28, the compressed gas activation line 38, the compressed gas cylinder 34, and the locking bar aperture 36. It should be noted here that although a mercury switch is discussed in herein, any type of inertial switch, activated by movement, could be utilized. Another point is that the compressed gas cylinder could contain various types of (preferably) inert gasses, such as Nitrogen or $CO_2$. The compressed gas cylinder could also be a chemical type gas release mechanism, such as is used in vehicle crash mitigation devices.

Figure 7:
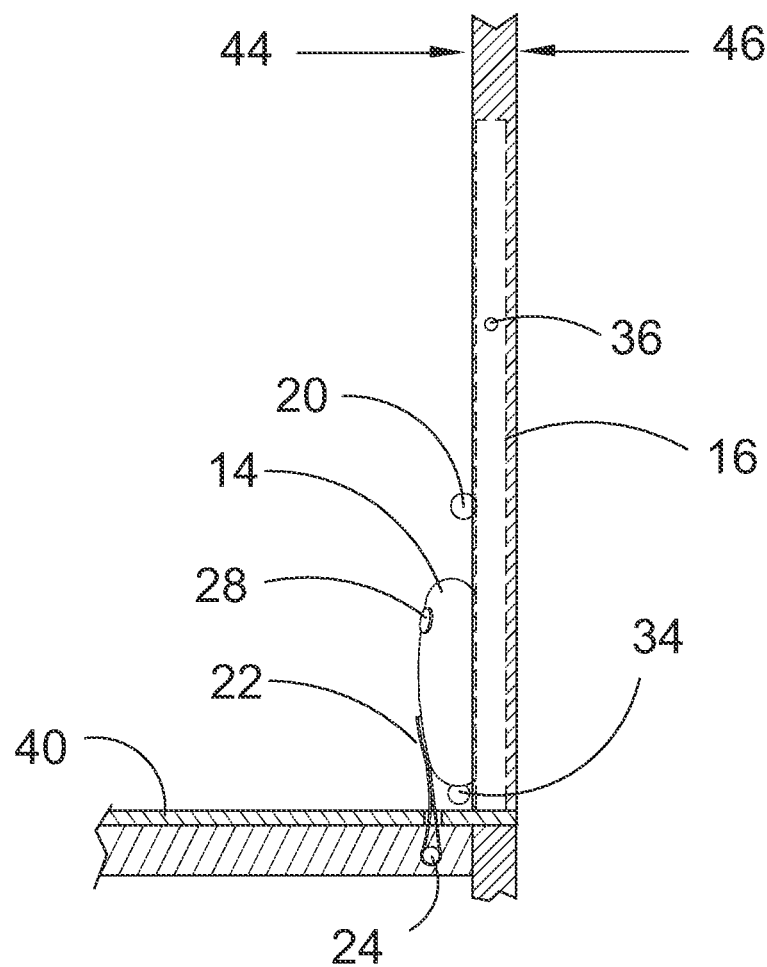
FIG. 7 is a sectional side view of the door of the present invention in the closed position.

Turning now to FIG. 7 the emergency evacuation system of the present invention 10 is seen first where the door 16 is shut. The slide or chute 14 and the mercury switch 28 are located on the interior side 44 of the door 16. The slide 14 is connected to the girt bar 24 (anchored in the floor 40) by means of the chute support straps 22. Also seen in the Figure are the compressed gas cylinder 34, the locking bar aperture 36, and the interior door handle 20.

Figure 8:
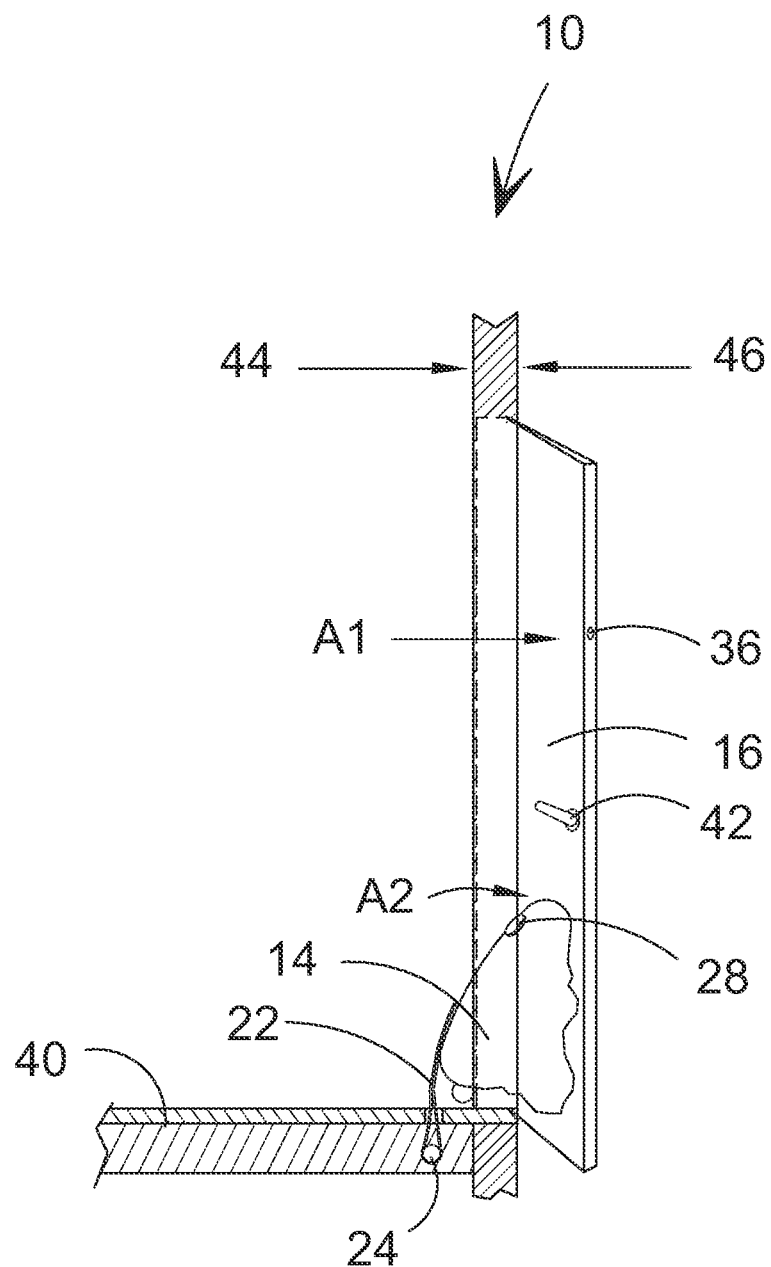
FIG. 8 is a sectional side view of the door of the present invention in a partially open position.

In FIG. 8, the emergency evacuation system of the present invention 10 is seen with the door 16 just beginning to open as indicated by directional arrow A1 after the alarm switch 18 (not seen in this Figure) is moved to the unlocked position as seen in the Figures discussed above. The chute or slide 14 has begun to deploy as the mercury switch 28 is activated by gravity. This deployment is indicated by directional arrow A2. The chute or slide is maintained in contact with the floor 40 and the anchored girt bar 24 by means of the chute support straps 22.

Figure 9:
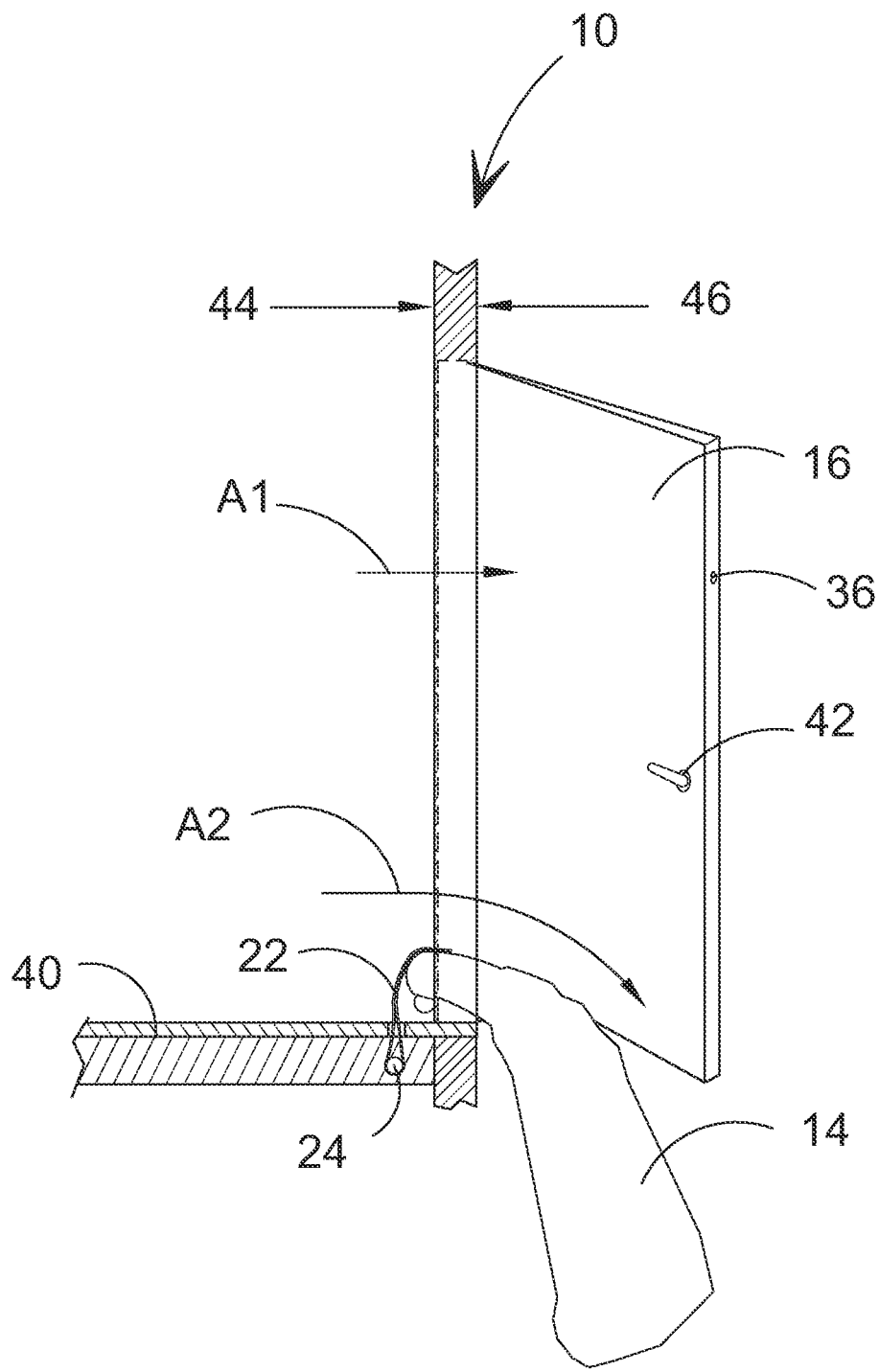
FIG. 9 is a sectional side view of the door of the present invention approximately ½ ways open and with the emergency chute or slide beginning to deploy.

In FIG. 9 the process is continued. The door 16 is now approximately halfway open (indicated by directional arrow A1) and the chute or slide 14 is falling out due to gravity (indicated by directional arrow A2). The mercury switch 28 has activated and the compressed gas cylinder 34 (through means of the compressed gas activation line 38) is inflating the chute 14 as it falls anchored to the building floor 40 by chute straps 22 and the girt bar 24.

Figure 10:
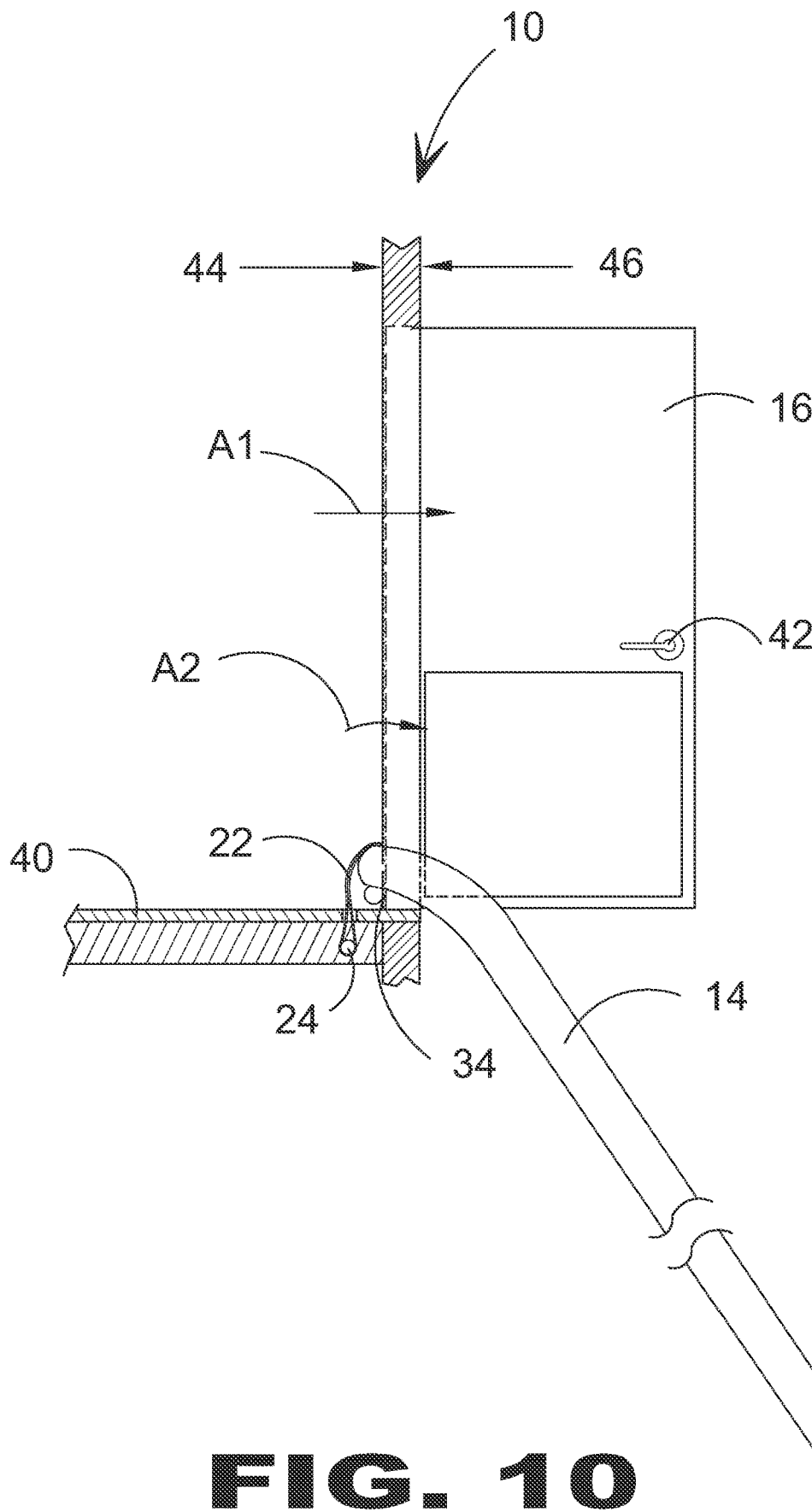
FIG. 10 is a sectional side view of the door of the present invention fully open and the emergency chute or slide completely deployed.

Turning now to FIG. 10 the door 16 is seen in the fully open position indicated at directional arrow A1 and the chute or slide 14 is fully deployed as indicated at A2, inflated by the compressed gas cylinder 34. As discussed above, the chute 14 is anchored to the building floor 40 by the chute support straps 22 and the girt bar 24.

Figure 11:
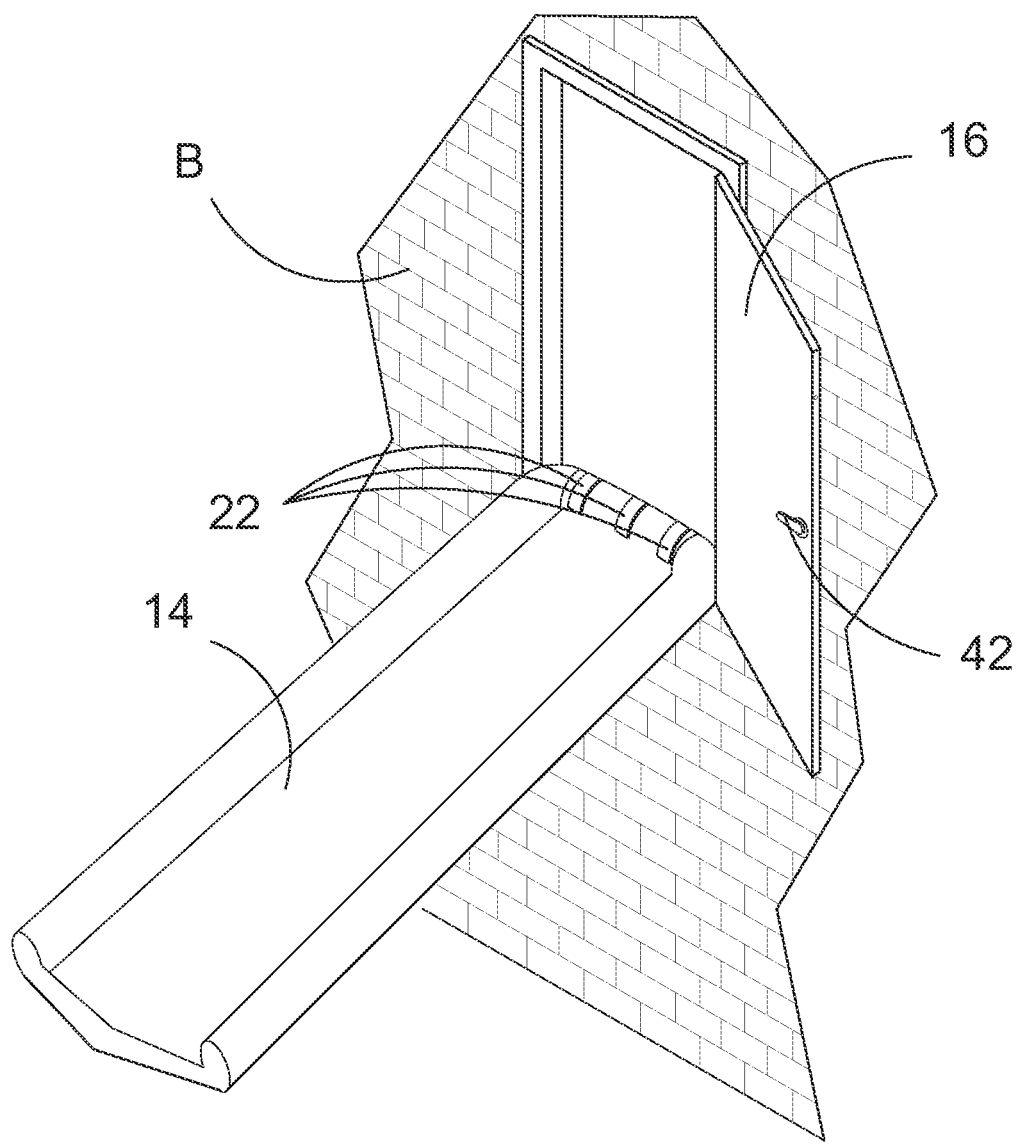
FIG. 11 is an illustrative perspective outside view of the present invention deployed from the building to allow rapid egress from therefrom.

Lastly, the discussion turns to FIG. 11, an illustrated perspective view of the present invention 10 seen deployed from the outside of the building B. The door 16 is fully opened and the chute or slide 14 extends out and down towards ground level allowing quick egress from the building B while remaining secured to building B through the chute support straps 22 attached on turn to the girt bar 24 anchored in the building floor 40.

The present invention, then, provides a safe alternative to the existing emergency exits that are available in the majority of public buildings in that it combines the quick egress allowed by a chute or a slide with the utility of a silent alarm that alerts the authorities to the emergency without panicking the perpetrators.

In the event of an emergency, the alarm switch 18 is moved from the locked position as seen in FIG. 4 to the unlocked position as seen in FIG. 5. This activates the silent alarm switch 30 sending a signal to police and fire responders. Moving the switch 18 from the locked to unlocked position additionally moves the locking/unlocking rod 26 to release the door 16 to open via the interior door handle 20. When the door handle 20 is turned and the door is opened, as seen in FIGS. 7 through 10, the resting evacuation chute or slide 14 falls out and, as it does, the mercury switch 28 is triggered. This, in turn, operates the compressed gas activation line 38, as seen in FIG. 6 which enables the compressed gas cylinder 34 to inflate the chute 14, as seen in FIGS. 9 and 10.

It should be noted that though the term "compressed gas cylinder" is used in this specification, many other types of inflation means could be used. Pumps, for instance, or a chemical reaction that produces gas quickly, such as is used in vehicle crash bags would serve equally well in the environment that the preset invention is intended for. After the inflation of the chute or slide 14, the people inside the building may rapidly escape by sliding down to ground level.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An emergency escape mechanism for a building having a floor with an exit door located within a doorway on an exterior of the building and elevated above a ground level, said emergency escape mechanism comprising;

an inflatable emergency escape slide, in a non-inflated state, having a first portion attached to a girt bar by escape slide support straps, said girt bar anchored in the floor of the building on an interior side of the doorway, said inflatable emergency escape slide is non-fixedly coupled to, and resting against, an interior side of the exit door;

an alarm box located proximate said exit door, said alarm box further including an alarm switch and where said alarm switch is further connected to a locking bar engaging said exit door;

an inertially-activated switch positioned at another portion of said inflatable emergency escape slide resting against the exit door;

an inflation device in fluid communication with said emergency escape slide, said inertially-activated switch coupled to said inflation device for controlling activation of said inflation device;

whereby in an emergency, said alarm switch is activated, disengaging said locking bar and unlocking said exit door and wherein when said exit door is opened, said inflatable emergency escape slide no longer rests against said exit door and falls out of the doorway, said inertially-activated switch detecting said fall and activating said inflation device in response to said fall, thereby inflating said inflatable emergency escape slide outside the building.

2. The emergency escape mechanism according to claim 1 wherein said inflation device comprises a gas release means.

3. The emergency escape mechanism according to claim 2 wherein said gas release means includes a compressed gas tank.

4. The emergency escape mechanism according to claim 1 wherein said alarm switch further includes a silent alarm.

5. The emergency escape mechanism according to claim 1, wherein said locking bar engages a latch extending between said exit door and the building.

6. The emergency escape mechanism according to claim 1, wherein said inertially-activated switch is a mercury switch.

7. The emergency escape mechanism according to claim 1, wherein said girt bar is located at a lower portion of the doorway.

* * * * *